(12) United States Patent
Lee et al.

(10) Patent No.: US 6,765,595 B2
(45) Date of Patent: Jul. 20, 2004

(54) DUAL MODE DATA FIELD

(75) Inventors: Letitia K. Lee, San Jose, CA (US); Patrick Siu-Nang See, Milpitas, CA (US)

(73) Assignee: International Business Machines Corporation, Armonk, NY (US)

( * ) Notice: Subject to any disclaimer, the term of this patent is extended or adjusted under 35 U.S.C. 154(b) by 538 days.

(21) Appl. No.: 09/932,111

(22) Filed: Aug. 16, 2001

(65) Prior Publication Data

US 2003/0035011 A1 Feb. 20, 2003

(51) Int. Cl.$^7$ .............................................. G06F 15/00
(52) U.S. Cl. ...................... 345/780; 345/853; 707/100
(58) Field of Search ................. 345/780, 853, 345/854, 855, 763, 765; 707/1, 100, 102, 103

(56) References Cited

U.S. PATENT DOCUMENTS

| | | | |
|---|---|---|---|
| 4,481,603 A | 11/1984 | McCaskill et al. | |
| 5,450,538 A | 9/1995 | Glaser et al. | |
| 5,895,478 A | 4/1999 | Pollard | |
| 5,940,842 A | 8/1999 | Sakuta | |
| 6,044,383 A | 3/2000 | Suzuki et al. | |
| 6,166,739 A | * 12/2000 | Hugh | ......................... 345/853 |
| 6,209,010 B1 | 3/2001 | Gauthier et al. | |
| 6,404,446 B1 | * 6/2002 | Bates et al. | .................. 345/854 |

FOREIGN PATENT DOCUMENTS

| | | | | |
|---|---|---|---|---|
| JP | 3020858 A | 1/1991 | ........... | G06F/15/20 |
| JP | 8314917 A | 11/1996 | ........... | G06F/17/22 |
| JP | 2000268031 A | 9/2000 | ........... | G06F/17/22 |

OTHER PUBLICATIONS

"Text Wrapping on a dialog panel", *IBM Technical Disclosure Bulletin*, vol. 34, No. 8, Jan. 1992 pp. 111–113.

* cited by examiner

Primary Examiner—Cao Nguyen
(74) Attorney, Agent, or Firm—Gregory M. Plow

(57) ABSTRACT

A set of data field characters is displayed in a primary data field if the number of characters in this set of data field characters is equal to or less than the displayable capacity of the primary data field. If the number of characters in the set of data field characters is greater than the displayable capacity of the primary data field, then a proper subset of the set of data field characters is displayed in the primary data field in conjunction with the display of an indicia associated with the primary data field. In response to a user interaction with the indicia, the proper subset of data field characters and at least one additional character from the set of data field characters are displayed in a secondary data field, wherein the proper subset of data field characters and the at least one additional character are simultaneously viewable by the user in the secondary data field.

31 Claims, 9 Drawing Sheets

DUAL MODE DATA FIELD

FIELD OF INVENTION

The present invention relates to the display and edit of data on computer systems and electronic devices. More specifically, the present invention is directed to an improvement for achieving higher utilization of the viewable area of a display unit (hereinafter referred to as a screen) with enhanced accuracy and efficiency when entering or editing characters within a data field.

BACKGROUND

The quantity of data managed by electronic devices and computer systems is growing at a phenomenal rate. This is due to many factors not the least of which is the mass migration of manual business processes to automated internet applications as we move to a more "connected world". As more and more data is entered, displayed and edited in support of these and other applications by an ever increasing percentage of the world population, there is a growing need for enhancements that facilitate data editing accuracy and efficiency. (The term "edit", as used hereinafter, is intended to encompass data entry, data update, data deletion and data insertion).

Computer systems and electronic devices manage the content and form of a screen during data edit and data display operations. Typically, the screen is a primary means of communication with the user of these systems and devices and, accordingly, the designer responsible for the content and form of displayed data must manage the screen in order to communicate effectively and efficiently. Since the size of the screen is very limited with respect to the vast quantity of information that may be displayed for any given application, the screen becomes a valuable resource that must be carefully managed.

When space is reserved on a screen for a particular data field (for example, reserving space for the street address of a sales contact) it is difficult for the application designer to know the maximum number of characters that would ever be needed. Using the street address as an example once again, an address may typically consume less than 25 characters whereas exceptions may consume hundreds of characters. The designer, utilizing prior art systems and methods, may resolve this problem by reserving a vast quantity of space on the screen to handle what is believed to be a maximum size. This is convenient for a user when dealing with very long character strings for a particular data field; however this approach renders a large portion of the screen unnecessarily reserved when shorter strings are used.

The designer, utilizing prior art systems and methods, may also decide to reserve a smaller portion of the screen to accommodate the typical amount of data entered for a particular data field. If the number of characters associated with a data field is greater than this typical value, then a subset of the characters is displayed in this reserved portion of the screen. The user is allowed to scroll the characters, typically using arrow keys on the keyboard, to view different portions of the field character data. This solution provides for more optimized utilization of the screen resource; however, those users dealing with longer character strings are greatly inconvenienced as they try to cope with displaying or editing data within a data field encumbered by a limited view of only a subset of the data at any given point in time.

Another trend that is increasing the use of electronic devices for displaying and editing data is the growing and accelerating pool of mobile users. Computerized applications are no longer constrained to the corporate desktop or home office, opening up opportunities for new types of applications with corresponding increases of data to be displayed and edited. Mobile users can choose from a plethora of devices that connect to Internet applications or perform as stand alone computational devices, or both. Examples include Personal Data Assistants (PDA), Internet connected cell phones, gaming devices, laptop computers, palmtop computers etc.

These mobile types of devices are designed to enhance portability by significant reductions in weight and size thereby making business and personal travel more convenient. While this trend facilitates portability, it also forces the user to cope with smaller screens than those typically found on desktop computer systems. This increases the scarcity of the screen resource and further exacerbates data display and editing problems by greatly increasing the probability that the space on the screen allotted to display or edit data for a particular data field is insufficient to contain all of the data associated with the data field. Trying to view or edit data, without the benefit of seeing a display of the entire string of data field characters associated with the data field at one time, greatly interferes with the efficiency of these processes as well as increases the probability that an editing error will be made.

Accordingly there is a need for improved ways of displaying and editing data on computers and electronic devices that can both optimize the utilization of the screen and at the same time provide for efficient and error free editing of long strings of data field characters. A designer utilizing prior art systems and methods is currently forced to choose between reserving greater amounts of valuable screen resource to accommodate a potentially long data field character string, or to conserve valuable screen resource and greatly increase the burden of those required to deal with longer data field character strings. It is highly desirable to both optimize utilization of the screen resource and at the same time provide efficiency and accuracy for those that may need to display or edit long data field character strings.

SUMMARY OF THE INVENTION

To overcome the limitations in the prior art briefly described above, the present invention provides a process, system or computer-readable medium for displaying and editing data with higher utilization of the screen resource while providing for improved editing efficiency and accuracy. A set of data field characters is displayed in a primary data field if the number of characters in this set of data field characters is equal to or less than the displayable capacity of the primary data field. If the number of characters in the set of data field characters is greater than the displayable capacity of the primary data field, then a proper subset of the set of data field characters is displayed in the primary data field in conjunction with the display of an indicia associated with the primary data field. In response to a user interaction with the indicia, the proper subset of data field characters and at least one additional character from the set of data field characters are displayed in a secondary data field, wherein the proper subset of data field characters and the at least one additional character are simultaneously viewable by the user in the secondary data field.

In this manner a primary data field can be defined to accommodate the number of data field characters typically associated with the data field while still providing the flexibility to generate a larger secondary data field whenever the displayable capacity of the primary data field is exceeded. Accordingly, higher utilization of the screen resource is achieved while enhancing the speed and accuracy of editing operations for long character strings.

Various advantages and features of novelty, which characterize the present invention, are pointed out with particularity in the claims annexed hereto and form a part hereof. However, for a better understanding of the invention and its advantages, reference should be made to the accompanying descriptive matter, together with the corresponding drawings which form a further part hereof, in which there is described and illustrated specific examples of preferred embodiments in accordance with the present invention.

BRIEF DESCRIPTION OF THE DRAWINGS

The preferred embodiments of the present invention will hereinafter be described in conjunction with the appended drawings, where like reference numbers denote the same element throughout the set of drawings.

DESCRIPTION OF THE PREFERRED EMBODIMENTS

One preferred embodiment, in accordance with the present invention, is directed to a programmed method for displaying and editing data with higher utilization of the screen resource while providing for improved editing efficiency and accuracy. The term "programmed method", as used herein, is defined to mean one or more process steps that are presently performed; or, alternatively, one or more process steps that are enabled to be performed at a future point in time. The term programmed method anticipates three alternative forms. First, a programmed method comprises presently performed process steps. Second, a programmed method comprises a computer-readable medium embodying computer instructions, which when executed by a computer performs one or more process steps. Finally, a programmed method comprises a computer system that has been programmed by software, hardware, firmware, or any combination thereof, to perform one or more process steps. It is to be understood that the term "programmed method" is not to be construed as simultaneously having more than one alternative form, but rather is to be construed in the truest sense of an alternative form wherein, at any given point in time, only one of the plurality of alternative forms is present.

The following description is presented to enable one of ordinary skill in the art to make and use the present invention and is provided in the context of a patent application and its requirements. Various modifications to the preferred embodiment will be readily apparent to those skilled in the art and the teaching contained herein may be applied to other embodiments. Thus, the present invention should not be limited to the embodiments shown but is to be accorded the widest scope consistent with the principles and features described herein.

Figure 1:
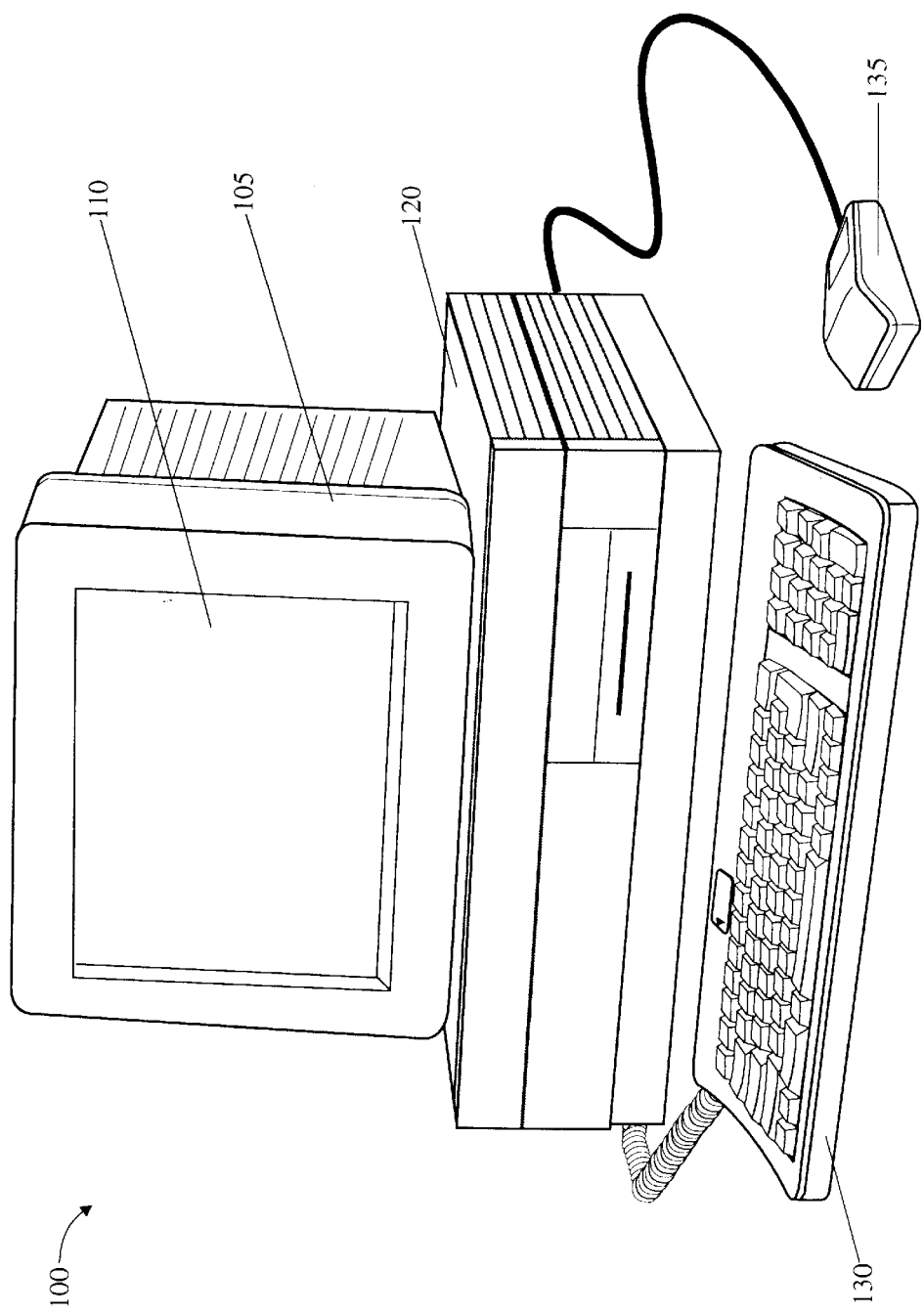
FIG. 1 is a pictorial representation of an exemplary computer system used to implement the preferred embodiment.

Referring now to the figures and in particular with reference to FIG. 1, a pictorial representation of personal computer system 100 is shown which may be used to implement the preferred embodiment of the present invention. Computer system 100 includes system unit 120, which controls the screen 110 of display unit 105 responsive to input from keyboard 130 and mouse 135. Computer system 100 represents a typical personal computer system, such as those manufactured by International Business Machines Corporation. FIG. 1 is exemplary in nature and, as further explained below in conjunction with FIG. 2, does not limit the scope of the present invention to just personal computer systems.

Figure 2:
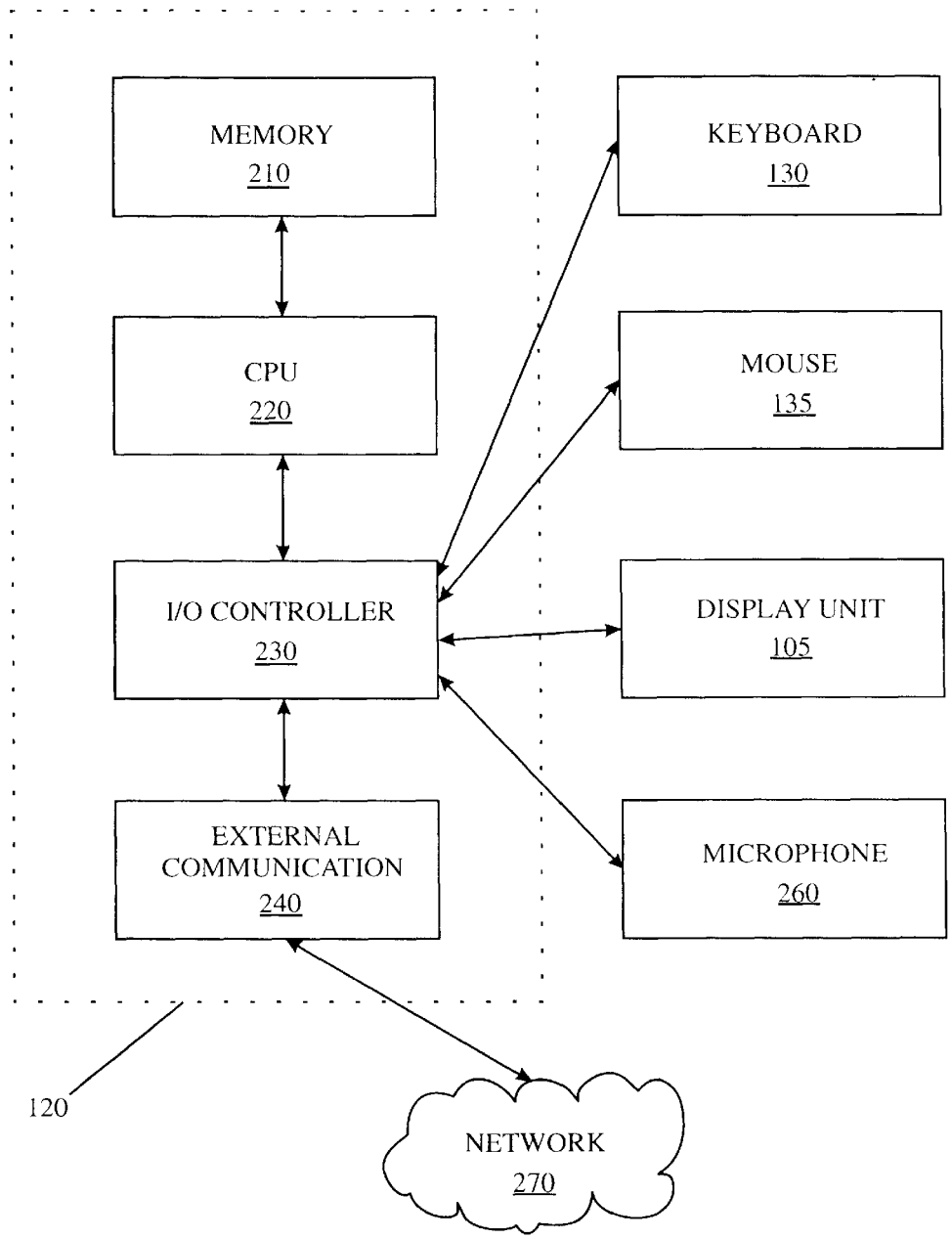
FIG. 2 is a block diagram illustrating an exemplary hardware environment in accordance with the preferred embodiment.

Referring now to FIG. 2, the present invention disclosed herein may be implemented on any computer system embodying memory 210, central processing unit (CPU) 220 and input/output (I/O) controller 230 which, while executing computer instructions residing in memory 210, operate in concert to at least partially control display unit 105. Accordingly, additional examples of computing systems suitable for implementing the present invention include laptop computers, workstations, servers, hand held computers, etc.

Several other types of electronic devices embodying memory 210, CPU 220 and I/O controller 230 may also be used for implementing the present invention as disclosed herein. Examples of these devices, which may have integrated displays or remote displays, include TV set top boxes, gaming consoles, Internet appliances and the like. Computer system 100 may operate as a standalone unit or may connected to one or more other computer systems utilizing network 270 connected via external communication 240, wherein computer system 100 operates in concert with one or more other network connected computer systems to at least partially control display unit 105. Any of these computers, computer systems, workstations, servers, personal digital assistants, gaming consoles, set-top boxes, internet appliances and the like are hereinafter referred to as a "computer" or a "computer system".

Those of ordinary skill in the art will also recognize that keyboard 130 and mouse 135 are exemplary and that numerous other input devices may be utilized in conjunction with the operation of computer system 100 in accordance with the preferred embodiment. For example, microphone 260 functionally coupled to voice recognition software (not shown) may be used in lieu of, or in conjunction with, keyboard 130. Additionally, a light pen or touch screen (not shown) may be used in lieu of, or in conjunction with, mouse 135. Those skilled in the art will recognize that these and many other variations are possible for computer system 100 without compromising its inherent suitability for implementation of the present invention as herein disclosed.

Generally, the present invention may be tangibly embodied in and/or readable from a computer-readable medium containing the program code (or alternatively, computer instructions). The program code, when read and executed by computer system 100, causes computer system 100 to perform the process steps necessary to control the content and form of screen 110 in a manner that improves utilization of the screen resource and improves the efficiency and accuracy of data editing operations. Thus, a preferred embodiment of the present invention may be implemented as process steps (also known as a method), a computer system, or an article of manufacture using standard programming and/or engineering techniques to produce software, firmware, hardware, or any combination thereof. The term A article of manufacture@ (or alternatively, A computer program product") as used herein is intended to encompass program code accessible from any computer-readable device, carrier, or media. Examples of a computer readable device, carrier or media include, but are not limited to, palpable physical media such as a CD ROM, diskette, hard drive and the like, as well as other non-palpable physical media such as a carrier signal, whether over wires or wireless, when the program is distributed electronically.

Figure 3:
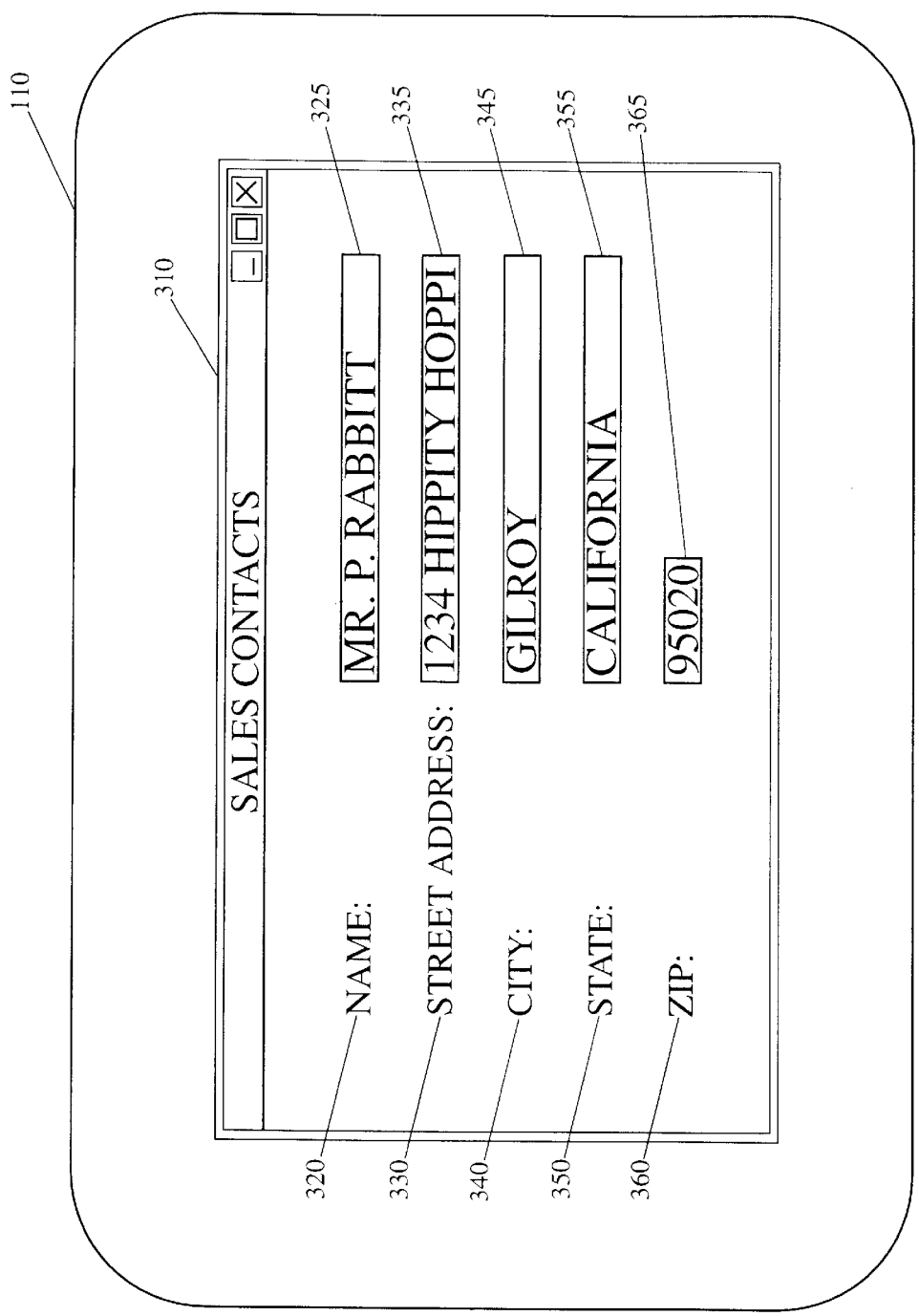
FIG. 3 shows an exemplary prior art screen.

FIG. 3 is exemplary of data fields in the prior art. An exemplary sales application displays information 310 on screen 110 pertaining to a particular sales contact. Information 310 includes primary data fields 325, 335, 345, 355 and 365 with corresponding data field names of NAME 320, STREET ADDRESS 330, CITY 340, STATE 350 and ZIP 360, respectively. The displayable capacity of primary data field 335 is insufficient to contain all data field characters corresponding to the currently displayed street address data field. The user of a prior art system may scroll the data field characters in primary data field 335, through explicit or implicit actions, in order to view and/or edit different portions of field character data associated with primary data field 335. Primary data field 335 may be problematic for a user desiring to view and/or edit the corresponding data field characters because of the inability to view all of the associated data field characters simultaneously.

Alternatively, prior art systems may allocate a substantially larger portion of screen 110 for primary data field 335 to accommodate the occasionally very long street name (not shown). While this may improve the speed and accuracy of editing operations when the string of data field characters is long, this technique may result in extremely inefficient utilization of the viewable area of screen 10, since the typical string of data field characters for primary data field 335 may be considerably shorter than the extreme case.

Figure 4:
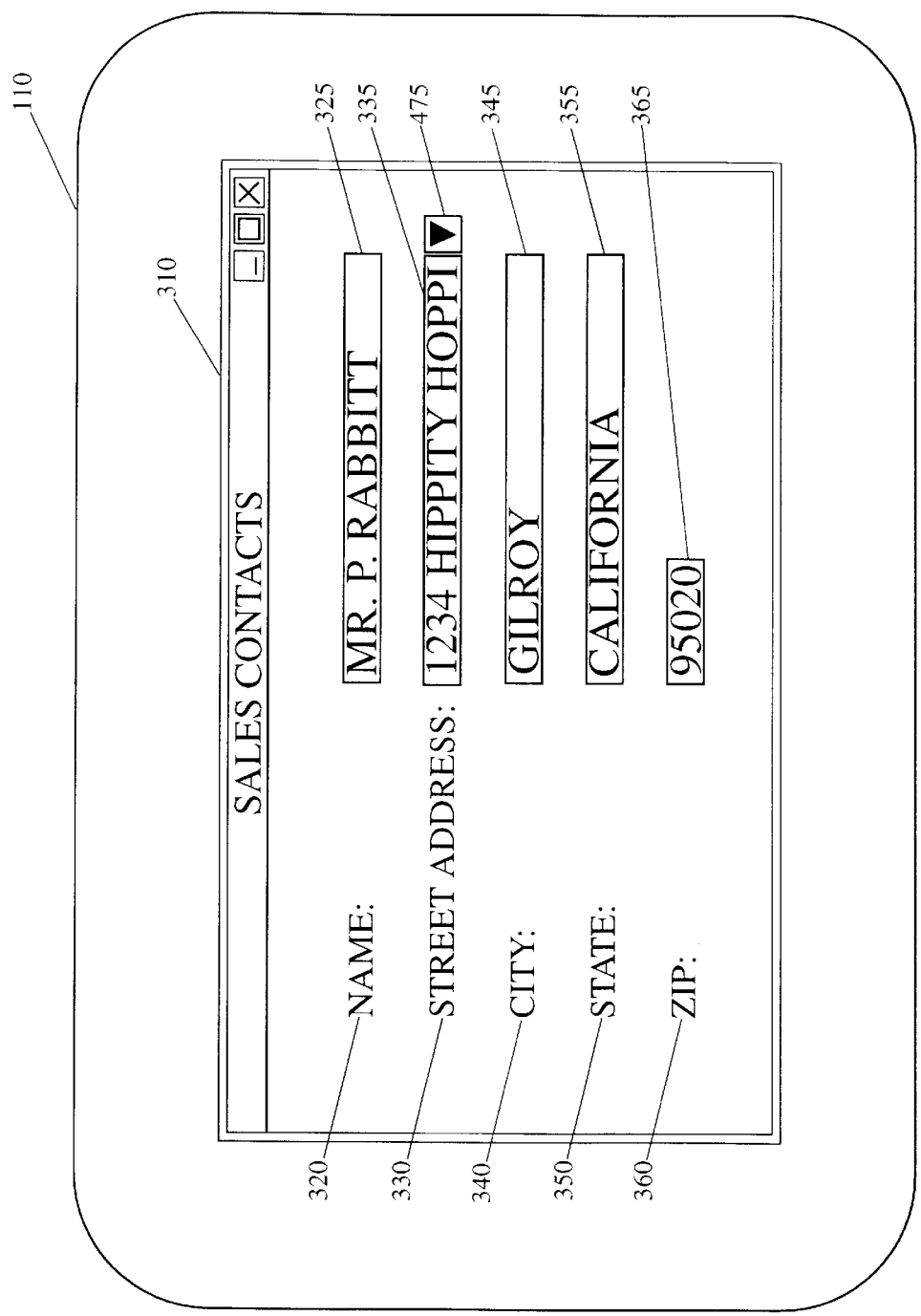
FIG. 4 shows an exemplary screen with a primary data field and associated indicia in accordance with the preferred embodiment.

Referring now to FIG. 4, the same sales contact information 310 is displayed on screen 110 in accordance with the preferred embodiment. Primary data field 335 has appended thereto indicia 475, which indicates to the user of screen 10 that primary data field 335 has a displayable capacity that is less than the number of data field characters to be displayed therein. The user may view and/or edit primary data field 335 in a scrolling mode, as described above; or, alternatively, the user may interact with indicia 475 to view/edit data with an increased number of data field characters simultaneously viewable. The user may interact with indicia 475 in a variety of ways, such as utilizing mouse 135 to position a cursor (not shown) over indicia 475 and then clicking the left mouse button of mouse 135. Those of ordinary skill in the art will recognize that numerous methods are known in the art for interacting with displayed indicia 475 including the use of touch screens, light pens, and the like.

Figure 5:
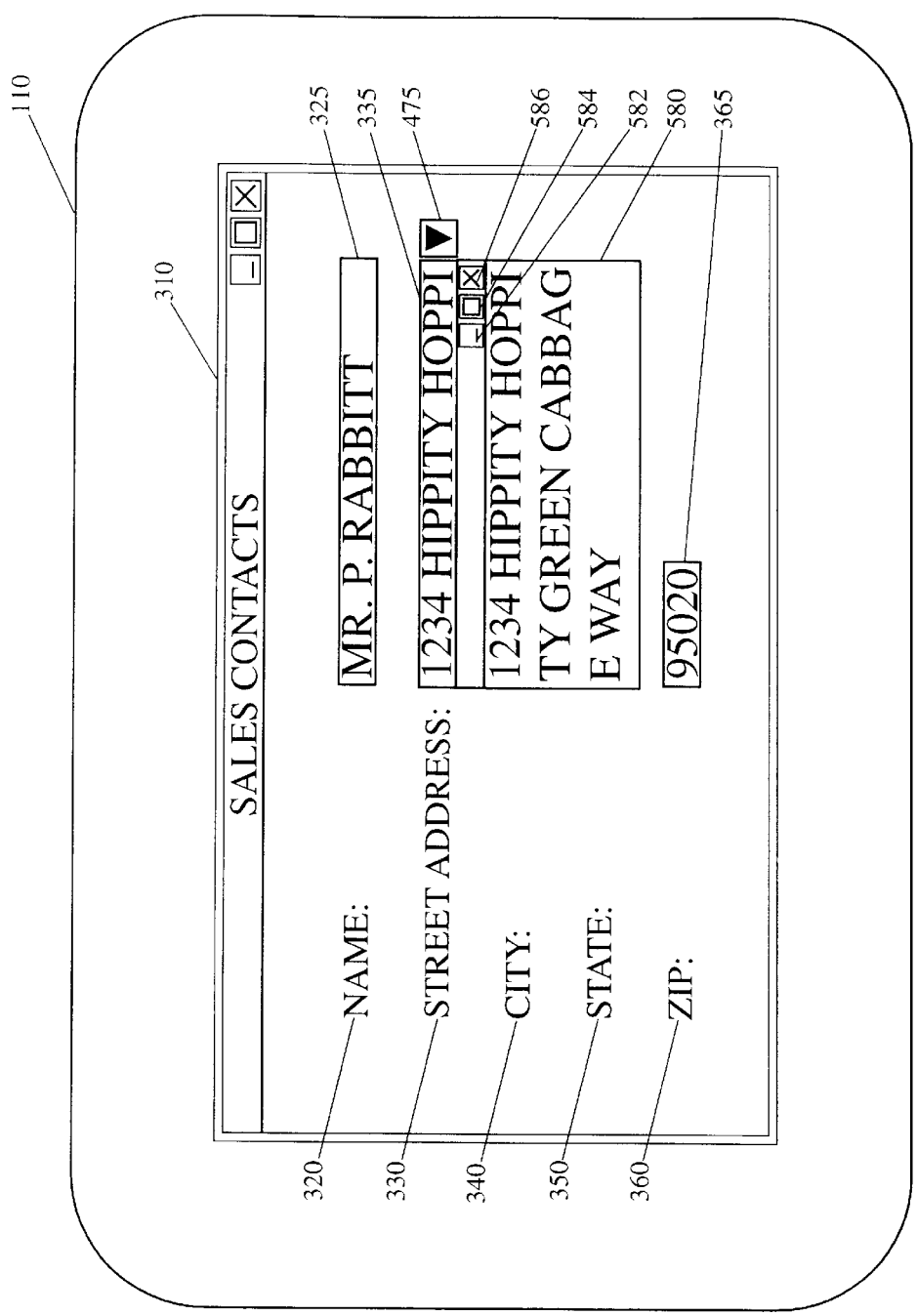
FIG. 5 shows an exemplary screen with a secondary data field in accordance with the preferred embodiment.

Referring now to FIG. 5, in accordance with the preferred embodiment, secondary data field 580 displays all data field characters associated with primary data field 335 in response to a user interaction with indicia 475. The user may now view and/or edit data field characters associated with primary data field 335 within secondary data field 580, wherein greater speed and accuracy may be achieved for various editing tasks. The user simultaneously views all data for primary data field 335 making edit changes less prone to error and, at the same time, expediting the editing/viewing process by avoiding the additional scrolling steps that are otherwise frequently required when the capacity of a data field is exceeded. Upon the completion of the viewing and/or editing of data field characters for primary data field 335, the user may once again interact with indicia 475 to close secondary data field 580 and return the display of information 310 to the form depicted in FIG. 4. When secondary data field 580 is closed, all editing changes that were completed in secondary data field 580 are retained for conventional viewing in primary data field 335. Those of ordinary skill in the art will appreciate that many alternative methods may be utilized to close secondary data field 580, some of which are further disclosed infra.

As additional data field characters are entered, secondary data field 580 may be smaller than an ideal size to facilitate continued convenient viewing and editing. To provide for this anticipated need, in another embodiment, secondary data field 580 may be resizable. While remaining attached (or approximately adjacent to) primary data field 335, secondary data field 580 may be expanded horizontally, vertically, or both horizontally and vertically utilizing a variety of techniques known in the art (not shown). For example, utilizing mouse 135, a conventional "click, hold and drag" operation may be used to extend the left side, the right side or bottom side of secondary field 580. Many other techniques are known in the art for increasing the size of a rectangular area displayed on screen 110.

Figure 6:
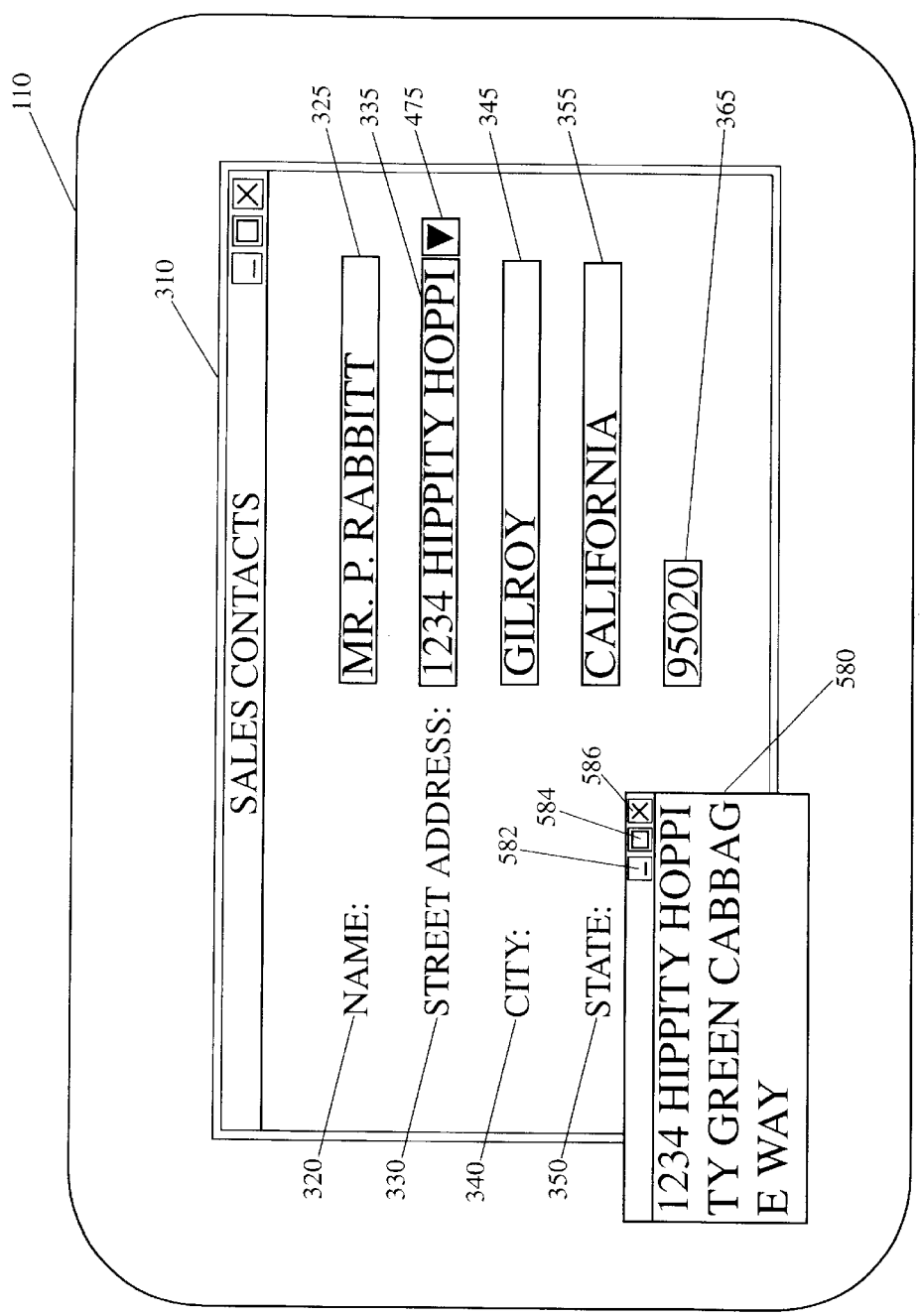
FIG. 6 shows an exemplary screen with a relocated secondary data field in accordance with the preferred embodiment.

Secondary data field 580 temporarily displaces data fields 345 and 355, previously shown in FIG. 4, named CITY 340 and STATE 350 respectively. In certain situations it may be desirable for a user to be able to view data field 345 and/or data field 355 simultaneous with secondary data field 580. To facilitate this potential need, the preferred embodiment, as shown in FIG. 6, provides for the relocation of secondary data field 580. Utilizing mouse 135, a conventional "click, hold and drag" operation, well known in the art, is used to relocate secondary data field 580 to new position on screen 110 that is no longer adjacent to corresponding primary data field 335 providing for an unobstructed view of data fields 345 and 355 simultaneous with the viewing of secondary data field 580. Those of ordinary skill in the art will recognize that secondary data field 580 may be relocated by numerous other means utilizing mouse 135, keyboard 130, or a variety of other input devices functionally coupled to system unit 120.

In one embodiment, secondary data field 580 is generated as a window with many standard window features known in the art. For example, secondary data field 580 may include buttons 582, 584 and 586 which may be utilized to reduce secondary data field 580 to an icon, change the size of secondary data field 580 or to close secondary data field 580, respectively. Further, mouse 135 may adjust the size of window 580 utilizing conventional window sizing means well known in the art. In an alternative embodiment, some of these window features may be inactive (indicated by grayed buttons 582–586) until secondary data field 580 is relocated to a new location. Upon moving secondary data field 580 to a new location, the standard window functionality is activated and the associated buttons 582–586 are crisply displayed in accordance with their active state.

Alternatively, rather than moving secondary data field 580 as the means to activate the standard window functionality, a unique indicia is provided (not shown) in or proximate to secondary data field 580. In this embodiment, buttons 582–586 are not initially displayed. The user may interact with this unique indicia to transform secondary data field 580 into a window wherein standard window functionality is activated and the associated buttons 582–586 are displayed and activated. Those of ordinary skill in the art will recognize that secondary data field 580 may be implemented as a window with some or all the functionality discussed above; or, alternatively, secondary data field 580 need not have standard window functionality at all.

Figure 7:
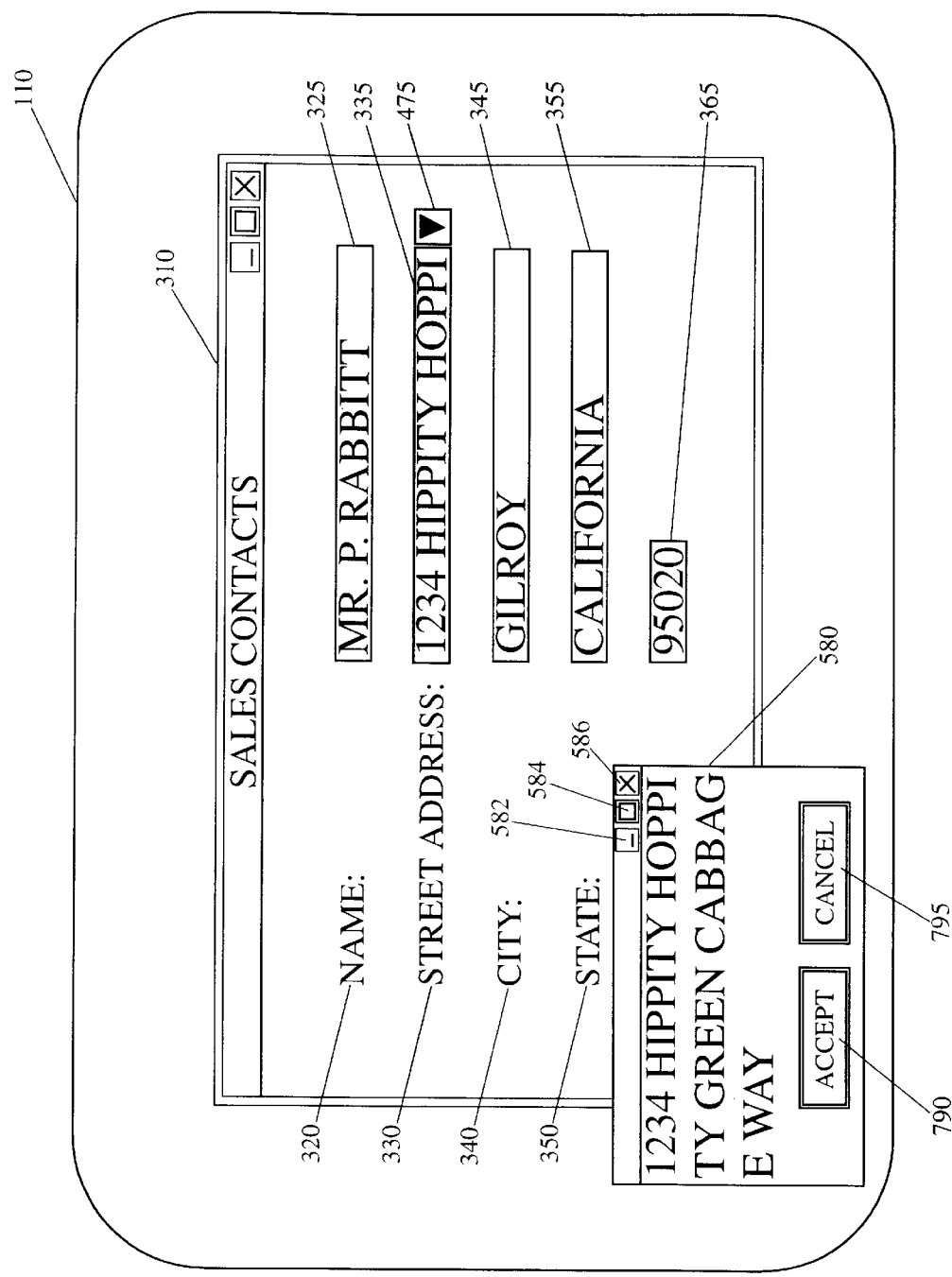
FIG. 7 shows an exemplary screen with additional secondary data field controls in accordance with the preferred embodiment.

Referring now to FIG. 7, additional optional buttons 790 and 795 are added to secondary data field window 580 to accept and cancel, respectively, all editing changes made since secondary data field window 580 was created. The user may interact with accept button 790 in a conventional manner to indicate that all editing changes made are to be retained and that secondary data field window 580 is to be closed. The content of primary data field 335, reflecting all editing changes made in secondary data field window 580, may then be viewed and/or edited in scrolling mode in primary data field 335. Alternately, the user may interact with cancel button 795 in a conventional manner to indicate to computer system 100 that all editing changes made in secondary data field window 580 are to be discarded and that secondary data field window 580 is to be closed. In this event, the content associated with primary data field 335, prior to editing operations within secondary data field window 580, may be viewed and/or edited in scrolling mode in primary data field 335.

Figure 8:
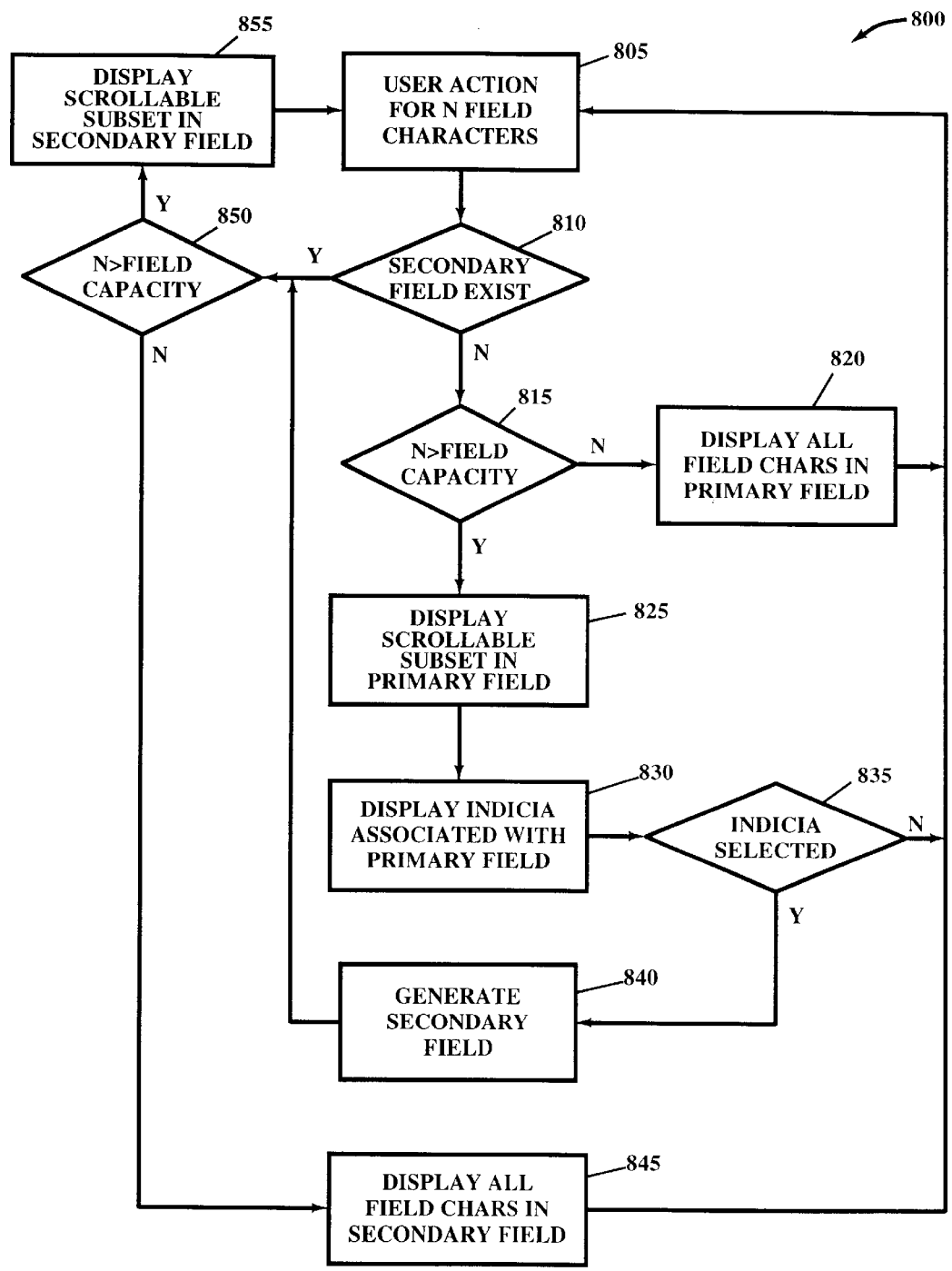
FIG. 8 is a flow diagram in accordance with one aspect of the preferred embodiment.

Referring now to FIG. 8, flow diagram 800 teaches the preferred embodiment steps for displaying and editing data with higher utilization of the screen resource while providing for improved editing efficiency and accuracy. A user action is detected in step 805 involving a data field which has N data field characters associated with it. In step 810 a check is made to determine if a corresponding secondary data field is currently displayed. If so, a check is made, in step 850, to determine if N is greater than the displayable capacity of the secondary data field in which case, in step 855, a subset of data field characters is displayed in the secondary data field in scrollable mode. Otherwise, in step 845, the entire set of N data field characters is displayed in the secondary data field. Following the display of data field characters in the secondary data field, either by step 855 or step 845, processing repeats with step 805 where the next user action is processed.

Returning now to step 810, if the secondary data field is not currently displayed then, in step 815, another check is made to determine if the capacity of the primary data field will be exceeded with the display of N data field characters. If the capacity will not be exceeded, in step 820 all N data field characters are displayed in the primary data field and the indicia, indicating display capacity exceeded, is not displayed. Then, at step 805, processing repeats with the next user action. Otherwise, in step 825, a subset of the N data field characters is displayed in the primary data field in scrollable mode.

Continuing with step 830, an indicia associated with the primary data field is displayed and then, in step 835, a check is made to determine if the user has selected or otherwise interacted with the indicia. If no interaction is detected, processing repeats with the next user action in step 805. Otherwise, the user's interaction with or selection of the indicia indicates the user's desire to view all data field characters associated with primary data field 335 simultaneously to facilitate improved efficiency and accuracy for the editing task at hand.

Accordingly, in step 840, a secondary data field is generated. Since the value of N is known at the time the secondary data field is generated, it is generally possible to generate the secondary data field with a displayable capacity equal to or larger than N. However, those of ordinary skill in the art will recognize that other overriding reasons may require the displayable capacity of the secondary data field to be less than N (for example, screen 110 may be of insufficient size) and, accordingly, a check is made in step 850 to determine if the displayable capacity of the secondary data field is sufficient for all N data field characters. If N is greater than the displayable capacity, processing proceeds to step 855 to display the data field characters in the secondary data field in scrollable mode and then continues to step 805 where processing repeats with the next user action. Otherwise, in step 845, all data field characters are displayed in the secondary data field and processing then continues to step 805 where processing repeats with the next user action.

Figure 9:
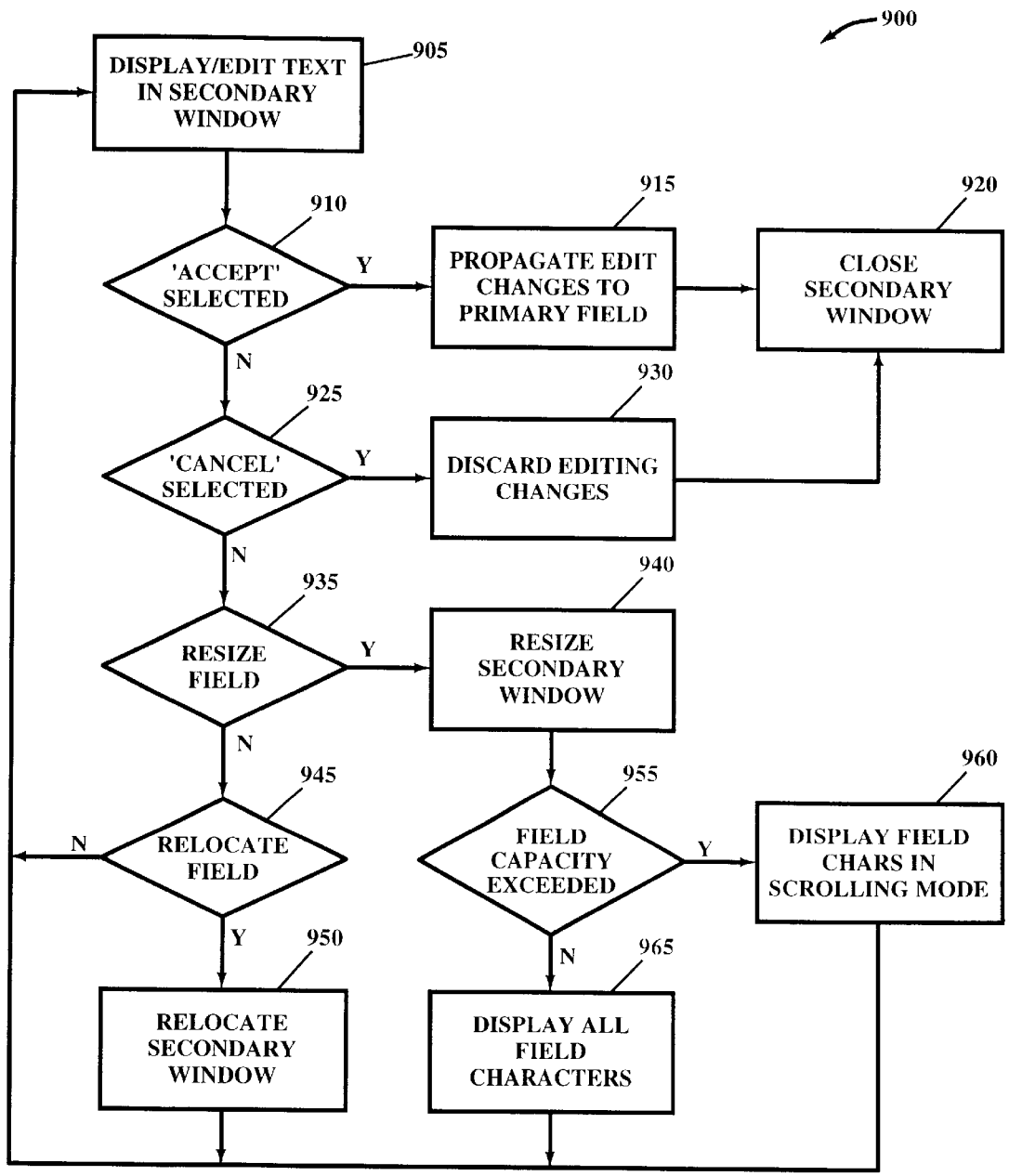
FIG. 9 is a flow diagram in accordance with another aspect of the preferred embodiment.

Referring now to flow diagram 900 in FIG. 9, various additional features of the preferred embodiment pertaining to a secondary data field window are shown. In step 905, data field characters are displayed and edited within a secondary data field window. Continuing with step 910, a check is made to determine if the user has selected 'ACCEPT', reflecting the user's desire to accept all editing changes made within the secondary data field window. If so, in step 915, all editing changes to the data field characters are retained and the associated primary data field is refreshed as required to reflect these editing changes and then, in step 920, the secondary data field window is closed.

Returning now to step 910, if 'ACCEPT' is not selected by the user, then processing proceeds to step 925 where is a check is made to determine if 'CANCEL' has been selected, reflecting the user's desire to discard all editing changes made in the secondary data field window since its creation. If so, in step 930, all such editing changes are discarded and the data field characters currently displayed in the associated primary data field remain unchanged. Processing then proceeds to step 920 where the secondary data field window is closed.

Returning now to step 925, if 'CANCEL' is not selected, then processing proceeds to step 935 where a check is made to determine if a user action is requesting that a resizing operation of a secondary data field window be performed. If so, in step 940, the secondary data field window is resized in accordance with the user's requirements. One popular technique for resizing a window involves placing a moveable cursor, controlled with an associated pointing device such as a mouse, over one of the four corners and, while depressing the left mouse button, moving the cursor to a new location. When the mouse button is released, the window is redisplayed to encompass the newly placed corner. Numerous other techniques for resizing windows are known by those of ordinary skill in the art. Following the resize processing of step 940, a check is made, in step 955, to determine if the number of data field characters to be displayed exceeds the displayable capacity of the newly sized secondary data field window. If so, in step 960, a subset of the data field characters are displayed within the secondary data field window in scrolling mode; otherwise, in step 965, all data field characters are displayed within the newly sized secondary data field window. Following display steps 960 or 965, processing then proceeds back to step 905 where the above described process repeats again according to new user selections and/or actions.

Returning now to step 935, if resizing is not requested by a user, processing proceeds to step 945 where a check is made to determine if a user action is requesting that a relocation of a secondary data field window be performed. If so, in step 950, the secondary data field window, and data field characters displayed therein, are relocated in accordance with the user's requirements. One popular technique for relocating a window involves placing the moveable cursor to the interior portion of the window and, while depressing the left mouse button, moving the cursor to a new location. When the mouse button is released the window, and data field characters displayed therein, are relocated in accordance with the new cursor position. Numerous other techniques for relocating windows are known by those of ordinary skill in the art. Following the relocation in step 950, processing proceeds back to step 905 where the above described process repeats again according to new user selections and/or actions.

Finally, returning to step 945, if a relocation request is not detected, then processing returns to step 905 where the above described process repeats again according to new user selections and/or actions.

Taken in combination flow diagrams 800 and 900, shown in FIGS. 8 and 9, respectively, provide for displaying and editing data with greater utilization of the screen resource while facilitating improved editing efficiency and accuracy.

References in the claims to an element in the singular is not intended to mean "one and only" unless explicitly so stated, but rather "one or more." All structural and function equivalents to the elements of the above-described exemplary embodiment that are currently known or later come to be known to those of ordinary skill in the art are intended to be encompassed by the present claims. No claim element herein is to be construed under the provisions of 35 U.S.C. '112, sixth paragraph, unless the element is expressly recited using the phrase "means for" or "step for." While the preferred embodiment of the present invention has been described in detail, it will be understood that modification and adaptations to the embodiment(s) shown may occur to one of ordinary skill in the art without departing from the scope of the present invention as set forth in the following claims. Thus, the scope of this invention is to be construed according to the appended claims and not limited to the specific details disclosed in the exemplary embodiments.

What is claimed:

1. A programmed method for displaying or editing data on a computer system, said programmed method comprising the process steps of:
    (a) displaying a set of data field characters in a primary data field if the number of data field characters in said set of data field characters is equal to or less than the displayable capacity of said primary data field;
    (b) displaying a proper subset of said set of data field characters in said primary data field in conjunction with the display of an indicia associated with said primary data field if the number of data field characters in said set of data field characters is greater than the displayable capacity of said primary data field; and
    (c) displaying said proper subset and at least one additional character from said set of data field characters in a secondary data field in response to a user interaction with said indicia wherein said proper subset and said at least one additional character are simultaneously viewable in said secondary data field by said user.

2. The programmed method of claim 1 wherein said programmed method is in the form of process steps.

3. The programmed method of claim 1 wherein said programmed method is in the form of a computer-readable medium embodying computer instructions for performing process steps.

4. The programmed method of claim 1 wherein said programmed method is in the form of a computer system programmed by software, hardware, firmware, or any combination thereof, for performing process steps.

5. The programmed method of claim 1 wherein said secondary data field is resizable.

6. The programmed method of claim 1 wherein said user interaction comprises pointing and clicking a mouse.

7. The programmed method of claim 1 wherein said secondary data field is a window.

8. The programmed method of claim 7 wherein said window comprises an accept button.

9. The programmed method of claim 8 further comprising:
    (a) modifying at least one data field character in said set of data field characters in response to a user editing operation;
    (b) displaying said modified at least one data field character in said window; and
    (c) propagating said modified at least one data field character into said primary data field and closing said window in response to a user interaction with said accept button, wherein said modified at least one data field character is visible within said primary data field.

10. The programmed method of claim 7 wherein said window comprises a cancel button.

11. The programmed method of claim 10 further comprising:
    (a) modifying at least one data field character in said set of data field characters in response to a user editing operation;
    (b) displaying said data field character in its modified form in said window; and
    (c) discarding said modification and closing said window in response to a user interaction with said cancel button, wherein said data field character in its unmodified form is viewable in said primary data field.

12. The programmed method of claim 7 wherein said window is resizable.

13. The programmed method of claim 7 wherein said window is relocatable.

14. The programmed method of claim 1 wherein said secondary data field is transformed into a window in response to a user interaction.

15. The programmed method of claim 14 wherein said user interaction comprises relocating said secondary data field.

16. The programmed method of claim 14 wherein said user interaction comprises interacting with an indicia associated with said secondary data field.

17. A method for managing the form and content of a screen during data entry operations on a computer system, said method comprising:
    (a) receiving characters, entered by a user, associated with a primary data field on said screen until said primary data field is fully utilized wherein said received characters are simultaneously viewable in said primary data field and said received characters form a set of previously entered characters;
    (b) receiving a next character entered by said user following receipt of said set of previously entered characters;

(c) displaying said next character in said primary data field, wherein at least one character from said set of previously entered characters is excluded from view in said primary data field;

(d) displaying an indicia associated with said primary data field whereby said user is informed that the displayable capacity of said primary data field has been exceeded; and (e) displaying a secondary data field associated with said primary data field on said screen in response to a user interaction with said indicia, wherein said set of previously entered characters and said next character are simultaneously viewable in said secondary data field.

18. The method of claim 17 wherein said next character is entered by using a keyboard.

19. The method of claim 17 wherein said next character is entered using a pointing device to select from a set of characters displayed on said screen.

20. The method of claim 17 wherein said next character is entered using voice recognition software.

21. An article of manufacture for use in a computer system tangibly embodying computer instructions executable by said computer system to perform process steps for managing the form and content of a screen during data entry operations, said process steps comprising:

(a) receiving characters, entered by a user, associated with a primary data field on said screen until said primary data field is fully utilized wherein said received characters are simultaneously viewable in said primary data field and said received characters form a set of previously entered characters;

(b) receiving a next character entered by said user following receipt of said set of previously entered characters;

(c) displaying said next character in said primary data field, wherein at least one character from said set of previously entered characters is excluded from view in said primary data field;

(d) displaying an indicia associated with said primary data field whereby said user is informed that the displayable capacity of said primary data field has been exceeded; and (e) displaying a secondary data field associated with said primary data field on said screen in response to a user interaction with said indicia, wherein said set of previously entered characters and said next character are simultaneously viewable in said secondary data field.

22. The article of manufacture of claim 21 wherein said next character is entered by using a keyboard.

23. The article of manufacture of claim 21 wherein said next character is entered using a pointing device to select from a set of characters displayed on said screen.

24. The article of manufacture of claim 21 wherein said next character is entered using voice recognition software.

25. A computer system for performing process steps to manage the form and content of a screen during data entry operations, said computer system comprising:

(a) a computer;

(b) computer program instructions for receiving characters entered by a user associated with a primary data field on said screen until said primary data field is fully utilized wherein said received characters are simultaneously viewable in said primary data field and said received characters form a set of previously entered characters;

(c) computer program instructions for receiving a next character entered by said user following receipt of said set of previously entered characters;

(d) computer program instructions for displaying said next character in said primary data field, wherein at least one character from said set of previously entered characters is excluded from view in said primary data field;

(e) computer program instructions for displaying an indicia associated with said primary data field whereby said user is informed that the displayable capacity of said primary data field has been exceeded; and (f) computer program instructions for displaying a secondary data field associated with said primary data field on said screen in response to a user interaction with said indicia, wherein said set of previously entered characters and said next character are simultaneously viewable in said secondary data field.

26. The system of claim 25 wherein said next character is entered by using a keyboard.

27. The system of claim 25 wherein said next character is entered using a pointing device to select from a set of characters displayed on said screen.

28. The system of claim 25 wherein said next character is entered using voice recognition software.

29. A method for entering data on a computer, said method comprising:

(a) entering N characters into a primary data field wherein N is equal to the displayable capacity of said primary data filed;

(b) entering 1 additional character into said primary data field and, in response to said entering of 1 additional character, viewing an indicia associated with said primary data field wherein said indicia signifies that the displayable capacity of said primary data field is exceeded;

(c) entering 0 to n additional characters into said primary data field following the display of said indicia wherein all said entered characters comprise a set of field characters and are displayed in said primary data field in scrolling mode;

(d) interacting with said indicia; and (e) simultaneously viewing said set of field characters in a secondary data field in response to said indicia interaction.

30. The method of claim 29 further comprising entering at least one additional character into said secondary data field and simultaneously viewing said set of field characters and said at least one additional character in said secondary data field.

31. The method of claim 30 further comprising closing said secondary data field and viewing said set of field characters and said at least one additional character in said primary data field in scrolling mode.

* * * * *